Figure 1:
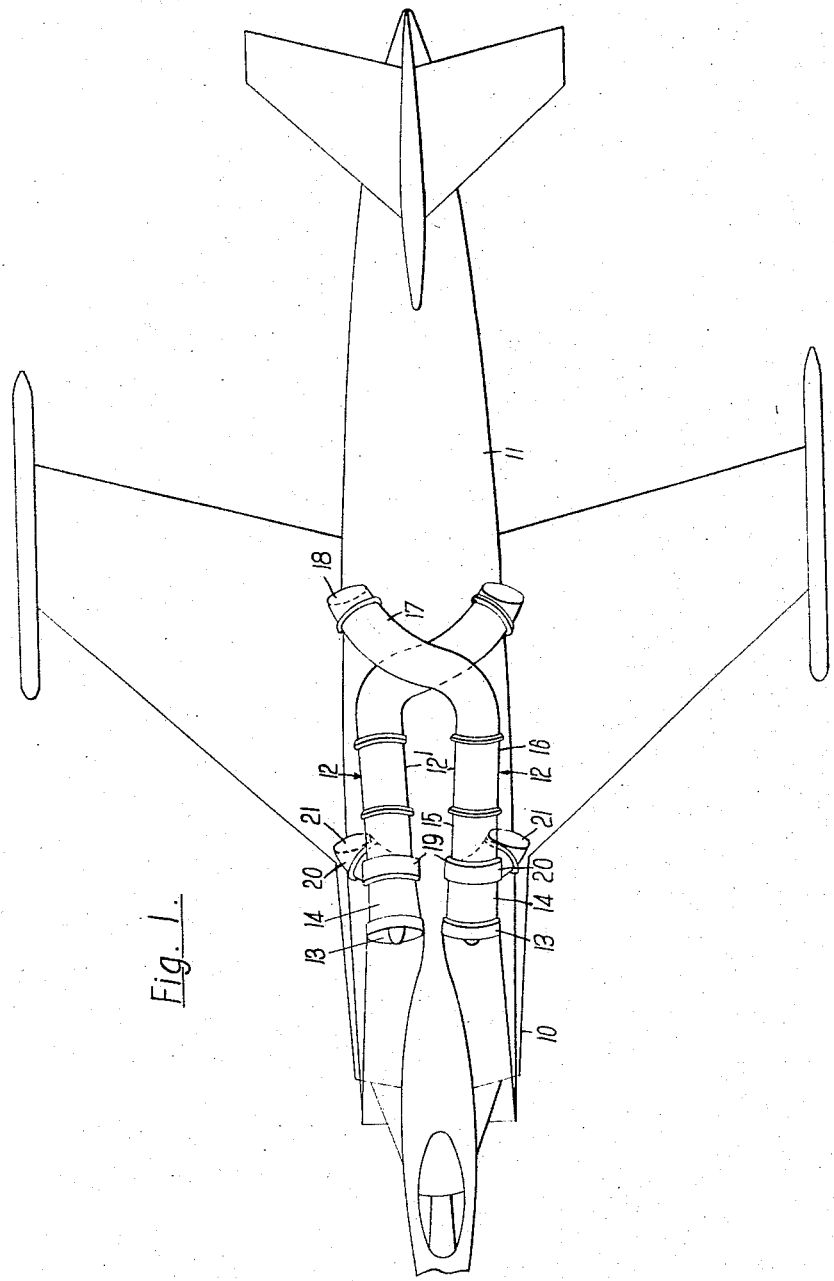

Dec. 20, 1966  G. L. WILDE ETAL  3,292,374
GAS TURBINE ENGINE AND AIRCRAFT PROVIDED THEREWITH
Filed March 9, 1964  4 Sheets-Sheet 4

United States Patent Office 3,292,374
Patented Dec. 20, 1966

3,292,374
GAS TURBINE ENGINE AND AIRCRAFT PROVIDED THEREWITH
Geoffrey Light Wilde, Cowers Lane, Derby, and James Alexander Petrie, Littleover, Derby, England, assignors to Rolls-Royce Limited, Derby, England, a company of Great Britain
Filed Mar. 9, 1964, Ser. No. 350,304
Claims priority, application Great Britain, Mar. 29, 1963, 12,675/63
5 Claims. (Cl. 60—224)

This invention concerns gas turbine jet propulsion engines and an aircraft provided therewith.

According to one aspect of the present invention there is provided a gas turbine jet propulsion engine comprising, in flow series, compressor equipment, combustion means, turbine equipment and a jet pipe through which combustion gases are exhausted to atmosphere, said engine also being provided with an outlet duct adapted to be supplied with compressed air direct from the compressor equipment of said engine to provide thrust, said outlet duct having disposed therewithin combustion equipment, including combustion stabilising means which is movable between an operative position in which it presents a relatively large impedance to air flow, and an inoperative position in which it presents a relatively small impedance to air flow.

The combustion stabilising means may comprise a plurality of downstream facing gutters. The gutters may be in two sets, each set comprising a plurality of concentric, semi-circular gutters.

Preferably each set of gutters is pivotally mounted about an axis coincident with the common diameter of its semi-circular gutters, the respective semi-circular gutters from each set forming substantially circular gutters when in the operative position.

Both sets of gutters may be pivoted about a common axis, the radii of curvature of the gutters in said sets all being different, the gutters being so arranged that, in said inoperative position, all the gutters are imbricated to present a relatively small impedance to air flow.

Preferably fuel ducts are provided for conveying fuel to said gutters, and apertures adjacent said gutters through which the fuel flow to mix with the compressed air and form a combustion mixture.

The engine preferably includes a pre-heat device for heating the compressed air in said outlet duct such that, upon injecting fuel into said pre-heated air, instantaneous combustion occurs, said pre-heat device comprising a combustion chamber within which a fuel/air mixture is burned, and ducting for directing the hot combustion products into the compressed air flowing through said outlet nozzle.

The engine compressor equipment preferably includes a low pressure and a high pressure compressor in flow series. The outlet nozzle may be adapted to receive compressed air from the low pressure compressor, the air supplied to said combustion chamber being bled from said high pressure compressor.

According to another aspect of the present invention there is provided an aircraft provided with two engines as set forth above.

The invention is illustrated, merely by way of example, in the accompanying drawings, in which:—

Figure 2:
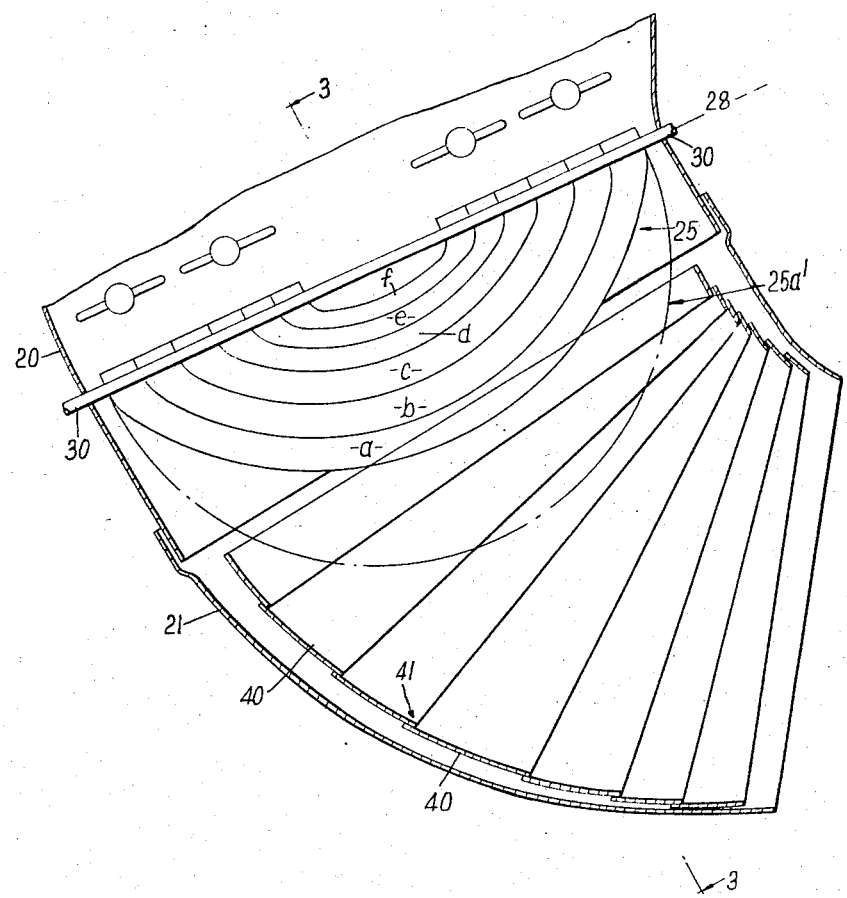
Figure 3:
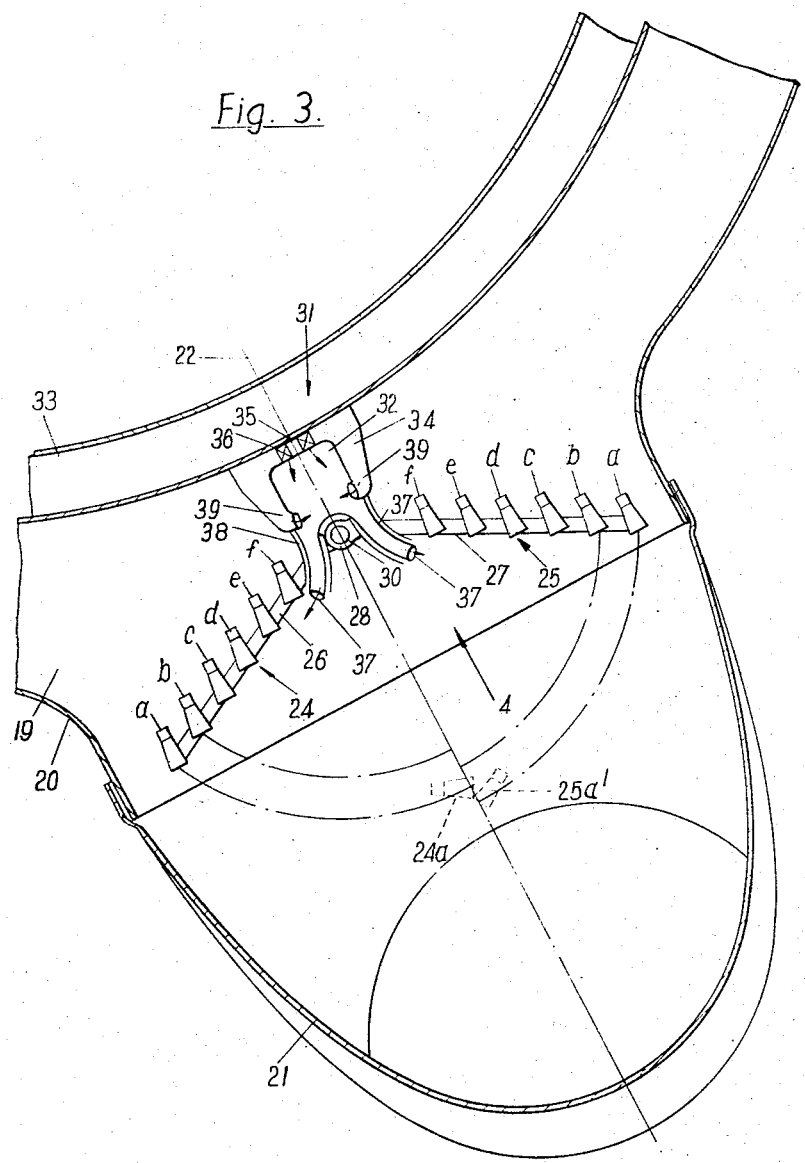
Figure 4:
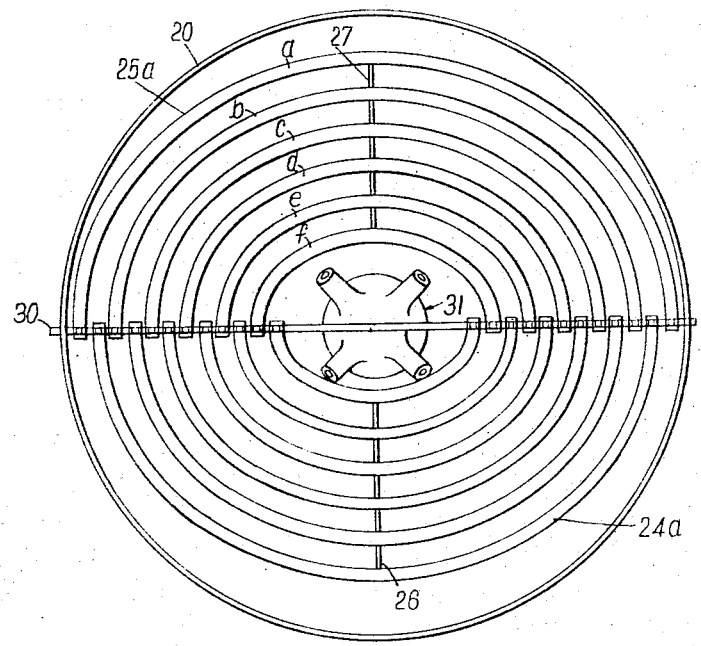

FIGURE 1 is a plan view of an aircraft provided with a gas turbine jet propulsion engine according to the present invention, FIGURE 2 is a part sectional view of part of the engine shown in FIGURE 1, FIGURE 3 is a view taken on the line 3—3 of FIGURE 2, and FIGURE 4 is a view taken in direction of arrow 4 of FIGURE 3.

Referring first to FIGURE 1, a supersonic aircraft 10 has a fuselage 11 on opposite sides of whose longitudinal axis there are mounted two gas turbine jet propulsion engines 12, so that one side 12' of each engine 12 faces the respective side of the other engine.

Each of the engines 12 comprises in flow series low pressure and high pressure compressors 13, 14 respectively, combustion equipment 15, and high pressure and low pressure turbines 16. Each engine 12 is provided with a curved jet pipe 17 which terminates in a final outlet nozzle 18 which is disposed on the other side of the engine. Each of the engines 12 also has an outlet duct 20 which is arranged to receive via an annular chamber 19, part of the air compressed in the low pressure compressor 13. Each outlet duct 20 terminates in a swivellable jet nozzle 21. Each duct 20 incorporates combustion equipment (to be described below).

The nozzles 18, 21 are arranged equidistant from the said longitudinal axis.

It will be appreciated that the nozzles 21 are disposed wholly to the same side of the said longitudinal axis as their respective engines. The jet pipes 17 however, are curved so as to cross the said axis, whereby their final outlet nozzles 18 are disposed on the opposite side of the longitudinal axis to that of their respective engines.

Accordingly, if one of the engines 12 should fail, thrust will still be exerted to opposite sides of the said longitudinal axis and, provided the thrusts of the gases passing through these nozzles 18, 21 do not greatly differ, there will be relatively little turning moment exerted about the said longitudinal axis.

Each of the nozzles 18 may, as disclosed in the specification to British Patent No. 913,312, comprise a frame member (not shown) which is rotatably mounted in its exhaust duct and which carries a plurality of jet deflector vanes (not shown) which extend parallel to each other, means, (not shown) being provided for effecting rotation of the frame member with respect to its exhaust duct. Such rotation permits the gases passing through the frame member to be forwardly, rearwardly or downwardly directed as desired.

Referring to FIGURES 2 and 3, each of the nozzles 21 is rotatably mounted about the end of an outlet duct 20. Means (not shown) are provided for effecting rotation of nozzles 21 relative to outlet ducts 20 and about an axis 22 such that the gases passing through nozzles 21 may be forwardly, rearwardly or downwardly directed as desired. A plurality of parallel jet deflector vanes (not shown) such as those disclosed in the specification to British Patent No. 913,312 may be provided in each nozzle 21.

Disposed within each outlet duct 20 is combustion equipment including combustion stabilizing means. Each combustion stabilizing means comprises two sets 24, 25, of semi-circular concentric gutters 24a–f and 25a–f. The gutters are shown in detail in FIGURES 3 and 4, but are represented by single lines only in FIGURE 2 for simplicity.

The sets 24, 25 are disposed on frameworks 26, 27 which are hinged together along a fixed axis 28. The axis 28 is coincident with the common diameter of each set of semi-circular gutters 24a–f and 25a–f.

As shown in FIGURES 2, 3 and 4, the sets 24, 25 are shown in their "open" or "operative" position. The sets are disposed in this manner when in use, and provide a relatively large impedance to air flow through the outlet duct 20. In this position the corresponding pairs of gutters 24a–25a, 24b–25b, 24c–25c etc., effectively form six substantially circular gutters which are substantially concentrically disposed about centres on the axis 22.

As shown in dotted lines in FIGURES 2 and 3, the sets 24, 25, may also be disposed in a "closed" or inoperative position in which corresponding pairs of gutters are disposed closely adjacent each other e.g. 24a', 25a' as seen in FIGURE 3. In this closed position, the gutter 24a–f and 25a–f are imbricated, and provide a relatively small impedance to air flow through the outlet duct 20. Thus, when the combustion equipment is not in use, the combustion stabilizing means may be "folded" into the minimum impedance position to reduce pressure losses in outlet duct 20.

To provide a combustion mixture within the outlet duct 20, fuel is added to the compressed air flowing therethrough. Fuel is supplied, by means not shown, through a common supply pipe 30, whose axis is coincident with axis 28. The fuel then flows through ducting (not shown) supplied in frameworks 26, 27 to gutters 24a–f and 25a–f. The fuel is injected into the air flowing through the outlet duct 20 through apertures formed adjacent gutters 24a–f, 25a–f. Such an arrangement is described and illustrated, for example, in the specification to British patent application No. 938,553.

Since the compressed air flowing through outlet duct 20 is relatively cool, a pre-heating device 31 (shown in FIGURES 2 and 3) is provided to heat the air. The pre-heating device 31 comprises a combustion chamber 32 which is supplied with compressed air from the high pressure compressor 14 through an annular duct 33 and annular swirlers 36. Fuel is injected into combustion chamber 32 through an aperture 35 between swirlers 36. The resulting fuel/air mixture is ignited (by means not shown) and the hot combustion gases are discharged into the outlet duct 20 through four exhaust ducts 37 of which only two are shown in FIGURE 3. Surrounding each exhaust duct 37 is a concentric cooling air duct 38 which is supplied with compressed air from annular duct 33 and an annular chamber 34 surrounding combustion chamber 32 and maintains the exhaust ducts 37 relatively cool. Dilution air to cool the combustion gases flowing from the combustion chamber 32 is introduced through four nozzles 39 (of which only two are shown in FIGURE 3) from annular chamber 34. The pre-heat device 31 is described in more detail in our co-pending application No. 12678/63.

The hot gases from exhaust ducts 37 mix with the relatively cool fuel/air mixture adjacent gutters 24a–f and 25a–f, raising its temperature sufficiently to effect instantaneous combustion of the mixture.

The resulting combustion gases exhaust to atmosphere through swivellable nozzles 21 thus providing thrust on the aircraft 10.

The walls of the nozzles 21 are protected from the heat of the exhausting combustion gases by a heat shield comprising a plurality of substantially cylindrical mating elements 40 (shown in FIGURE 2). Where adjacent elements 40 overlap, annular gaps 41 are formed, through which cool air can flow to cool the inner surfaces of elements 40.

It will be appreciated that reheat combustion equipment (not shown) may be included in the jet pipe 17 of each engine 12 to provide increased thrust, when required. Thus, using this reheat combustion equipment and also the combustion equipment in each outlet duct 20, the thrust provided by all four nozzles 18, 21 can be increased substantially. Thus increased thrust can be provided for vertical take-off and landing (with nozzles 18, 21 vertically disposed) and for high-speed forward flight, possibly of the order of Mach 2 (with nozzles 18, 21 horizontally disposed).

For subsonic cruise conditions, the combustion equipment in outlet ducts 20 may be retracted into its inoperative position, as described above, such that the pressure losses within outlet ducts 20 are reduced.

We claim:

1. A gas turbine jet propulsion engine comprising compressor equipment, combustion means, turbine equipment and a jet pipe through which combustion gases are exhausted to atmosphere, all arranged in flow series, said engine also being provided with an outlet duct supplied with compressed air direct from the compressor equipment of said engine to provide thrust, two sets of downstream facing concentric semi-circular gutters disposed within said outlet duct, a common axis about which said sets are pivoted, the radii of curvature of the gutters all being different and the sets being movable between an operative position in which they present a relatively large impedance to air flow, and an inoperative position in which all the gutters are imbricated to present a relatively small impedance to air flow.

2. A gas turbine jet propulsion engine as claimed in claim 1 further comprising a pre-heat device for heating the compressed air in said outlet duct such that, upon injecting fuel into said pre-heated air, instantaneous combustion occurs, said pre-heat device comprising a combustion chamber within which a fuel/air mixture is burned, and ducting for directing the hot combustion products into the compressed air flowing through said outlet duct.

3. An engine as claimed in claim 2 in which said compressor equipment includes a low pressure and a high pressure compressor in flow series, the outlet duct being adapted to receive compressed air from the low pressure compressor, the air supplied to said combustion chamber being bled from said high pressure compressor.

4. A gas turbine jet propulsion engine as claimed in claim 1 in which the said common axis is coincident with the common diameter of its semi-circular gutters, the respective semi-circular gutters from each set forming substantially circular gutters when in the operative position.

5. A gas turbine jet propulsion engine as claimed in claim 1 comprising fuel ducts for conveying fuel to said gutters, and apertures adjacent said gutters through which the fuel flows to mix with the compressed air and form a combustible mixture.

References Cited by the Examiner

UNITED STATES PATENTS 2,672,726  3/1954  Wolf et al.
2,707,372  5/1955  Cleveland _____ 60—39.72 X

FOREIGN PATENTS 851,153  10/1960  Great Britain.

MARK NEWMAN, *Primary Examiner.*

D. HART, *Assistant Examiner.*